United States Patent [19]
Yamagami et al.

[11] Patent Number: 5,497,367
[45] Date of Patent: Mar. 5, 1996

[54] OPTICAL RECORDING MEDIUM

[75] Inventors: Tamotsu Yamagami, Kanagawa; Yoichiro Sako, Chiba, both of Japan

[73] Assignee: Sony Corporation, Japan

[21] Appl. No.: 939,031

[22] Filed: Sep. 1, 1992

Related U.S. Application Data

[63] Continuation of Ser. No. 568,963, Aug. 17, 1990, abandoned.

[30] Foreign Application Priority Data

Aug. 25, 1989 [JP] Japan .................................. 1-219415

[51] Int. Cl.$^6$ ...................................................... G11B 7/24
[52] U.S. Cl. ............................................................ 369/275.2
[58] Field of Search ............................ 369/275.3, 275.1, 369/275.2, 275.4, 44.39, 13, 109; 428/64

[56] References Cited

U.S. PATENT DOCUMENTS

| | | | |
|---|---|---|---|
| 3,876,842 | 4/1975 | Bouwhuls . | |
| 4,501,000 | 2/1985 | Immink et al. . | |
| 4,716,560 | 12/1987 | Itonaga | 369/275.3 |
| 4,769,802 | 9/1988 | Tatsuguchi | 369/275.3 |
| 4,775,968 | 10/1988 | Ohsato . | |
| 4,797,752 | 1/1989 | Giddings | 369/275.3 |
| 4,907,216 | 3/1990 | Rijnsburger | 369/44.39 |
| 4,940,618 | 7/1990 | Hamada et al. | 369/275.1 |
| 5,090,007 | 2/1992 | Bulthuis | 369/275.4 |
| 5,150,339 | 9/1992 | Ueda et al. | 369/275.4 |
| 5,173,886 | 12/1992 | Satoh et al. | 369/275.3 |

FOREIGN PATENT DOCUMENTS

| | | |
|---|---|---|
| 0299573A1 | 1/1989 | European Pat. Off. . |
| 63-20769 | 1/1988 | Japan .................................. 369/275.1 |

OTHER PUBLICATIONS

Patent Abstracts of Japan, vol. 12, No. 439 (P–788), Nov. 18, 1988, and JP–A–63 167474 (Sony Corp), Jul. 11, 1988.
Patent Abstracts of Japan, vol. 11, No. 230 (P–599), Jul. 28, 1987, and JP–A–62 043839 (Sony Corp), Feb. 25, 1987.
Patent Abstracts of Japan, vol. 12, No. 240 (P–727), Jul. 8, 1988, and JP–A–63 032751 (Konica Corp), Feb. 12, 1988.
Patent Abstracts of Japan, vol. 13, No. 037 (P–819), Jan. 27, 1989, and JP–A–63 234426 (Canon Inc.), Sep. 29, 1988.
Patent Abstracts of Japan, vol. 12, No. 046 (P–665), Feb. 12, 1988, and JP–A–62 192943 (Canon Inc.), Aug. 24, 1987.

*Primary Examiner*—Stuart S. Levy
*Assistant Examiner*—Paul J. Ditmyer
*Attorney, Agent, or Firm*—Limbach & Limbach; Ian Hardcastle

[57] ABSTRACT

An optical storage medium provided with both a read-write area in which read-write data can be rewritably stored and a read-only area in which read-write data is previously stored in an unerasable manner. In the read-write area, a guide track is previously formed for tracking control, and read-write data is rewritably stored, for example photomagnetically, along the guide track. In the read-only area, data is stored along a read-only track that is offset over a portion of its length in a direction lateral to the track direction to represent the read-only data. This read-only data may be reproduced by detecting the laser light radiated from an optical pickup and reflected by the medium by a two-segment photodetector.

14 Claims, 4 Drawing Sheets

OPTICAL RECORDING MEDIUM

This is a continuation of application Ser. No. 07/568,963, filed on Aug. 17, 1990, now abandoned.

BACKGROUND OF THE INVENTION

1. Field of the Invention

This invention relates to an optical recording medium, such as a magneto-optical disk. More particularly, it relates to a recording medium of the type in which a recordable area, often called a RAM area, and a read-only or reproduce-only area, often called a ROM area, are provided on a single medium.

2. Related Art Statement

An optical recording medium for data recording is known. For example, in a magneto-optical disk, a tracking guide groove or grooves are provided on the disk in the form of a helix or concentric circles. Data is adapted to be recorded on or reproduced from the recording track along the track direction by taking advantage of the photomagnetic effects of the disk material, with the previously formed guide groove or grooves or the lands between the grooves used as the recording track. Data is recorded or reproduced photo-magnetically under a tracking servo based on optical detection of the guide grooves. In such a case, addresses and data are recorded alternately on the recording track, and data control is achieved on the basis of this address data, so that data having a specific address is recorded or reproduced on a block-by-block basis or a sector-by-sector basis.

It would be convenient for users and producers of software if data which is only to be read and not rewritten, such as an operating system or a basic dictionary, could be supplied in a pre-recorded form on an otherwise recordable medium. For this reason, a recording medium, such as a disk or a card, has been developed on which a read-only area (a so-called ROM area) and a recordable area (a so called RAM area) are provided together.

FIG. 1 shows an example of a magneto-optical disk as a recording medium on which the data which is only to be read is previously recorded. In this figure, a recordable, or RAM, area 2 on which signals can be recorded and a read-only, or ROM, area 3 are provided on the magneto-optical disk 1. In the RAM area 2, the preformed guide grooves or lands between the guide grooves are used as the recording tracks on which data is recorded photomagnetically. FIG. 1 shows part of two adjacent recording tracks, marked 4A and 4B. These can be adjacent parts of the same recording track if the recording track is in the form of a spiral. In the ROM area 3, tracks are formed in which data which is only to be read is previously recorded by pre-formatting, for example in the form of pits. FIG. 1 shows parts of two adjacent recording tracks, marked 5A and 5B. These can be adjacent parts of the same recording track if the recording track is in the form of a spiral.

However, in such a magneto-optical disk 1, the signals received by the tracking servo at the time of scanning the ROM area 3 may be based on pits as, for example, in the method disclosed in U.S. Pat. No. 3,876,842. Thus, since the tracking servo normally reproduces information from the RAM area 2 photomagnetically, the servo must be switched between the different formats of the RAM area 2 and the ROM area 3.

OBJECT AND SUMMARY OF THE INVENTION

In view of the foregoing, it is a principal object of the present invention to provide a recording medium having both a recordable area and a read-only area, in which tracking by a servo may be performed in a unified manner. The present invention provides an optical medium for storing a read-write information signal and a read-only information signal that can be read by the same optical means. The medium comprises a first area including a means for rewritably storing the read-write information signal. The means for rewritably storing the read-write information signal includes an unmodulated, pre-formed track. The medium also comprises a second area that is radially separated from the first area. The second area includes a read-only track along which the read-only information signal is stored. The read-only track has a track direction and a length in the track direction. The read-only track is in a nominal position in a direction lateral to the track direction over first portions of its length. The read-only track is in an offset position, which is offset from the nominal position in a direction lateral to the track direction, over second portions of the its length, to represent the read-only data.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF PREFERRED EMBODIMENT

Figure 1:
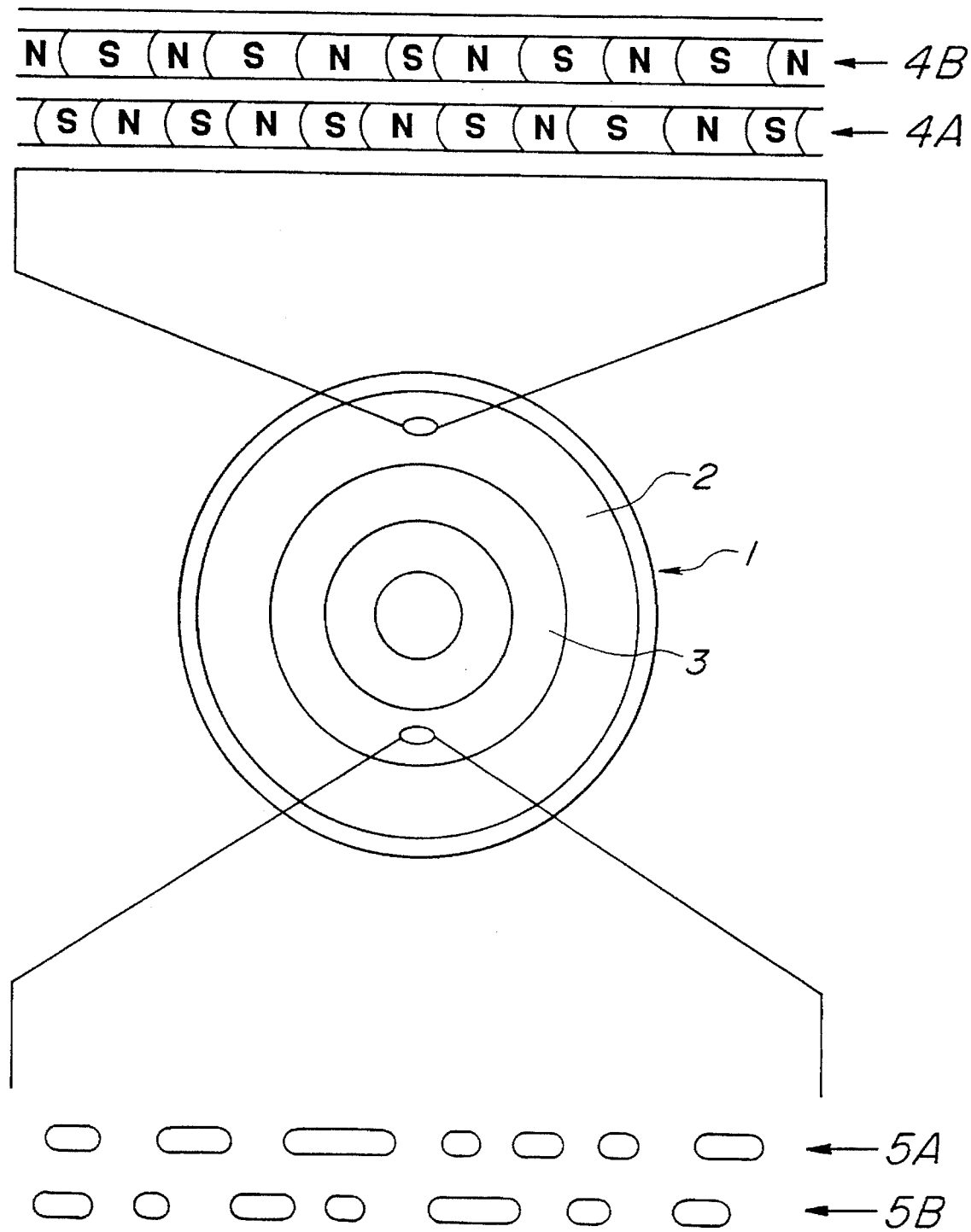
FIG. 1 is a diagrammatic planar view showing an example of a conventional disk having a read-only area.
Figure 2:
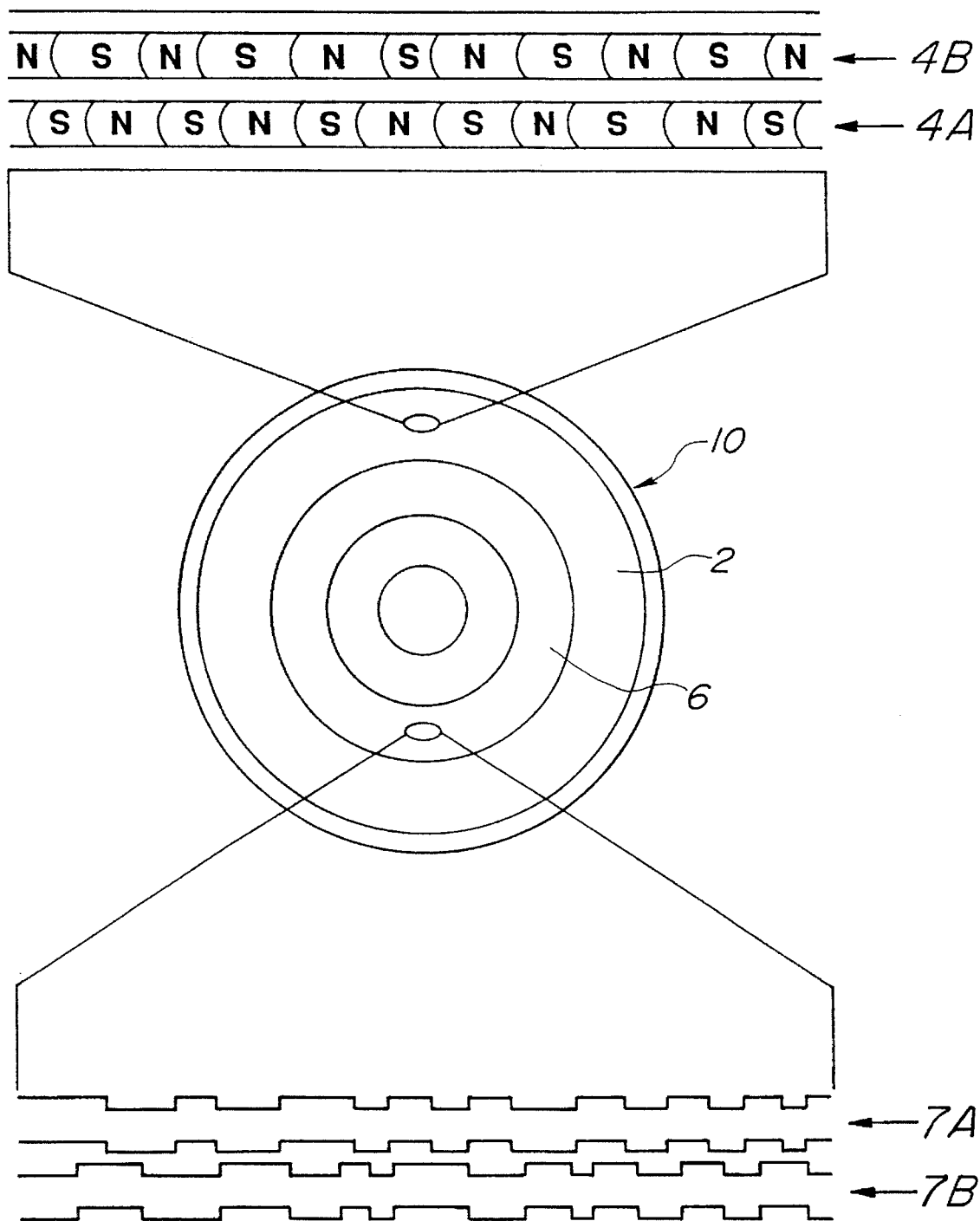
FIG. 2 is a diagrammatic planar view showing a magneto-optical disk according to an embodiment of the present invention.
Figure 3:
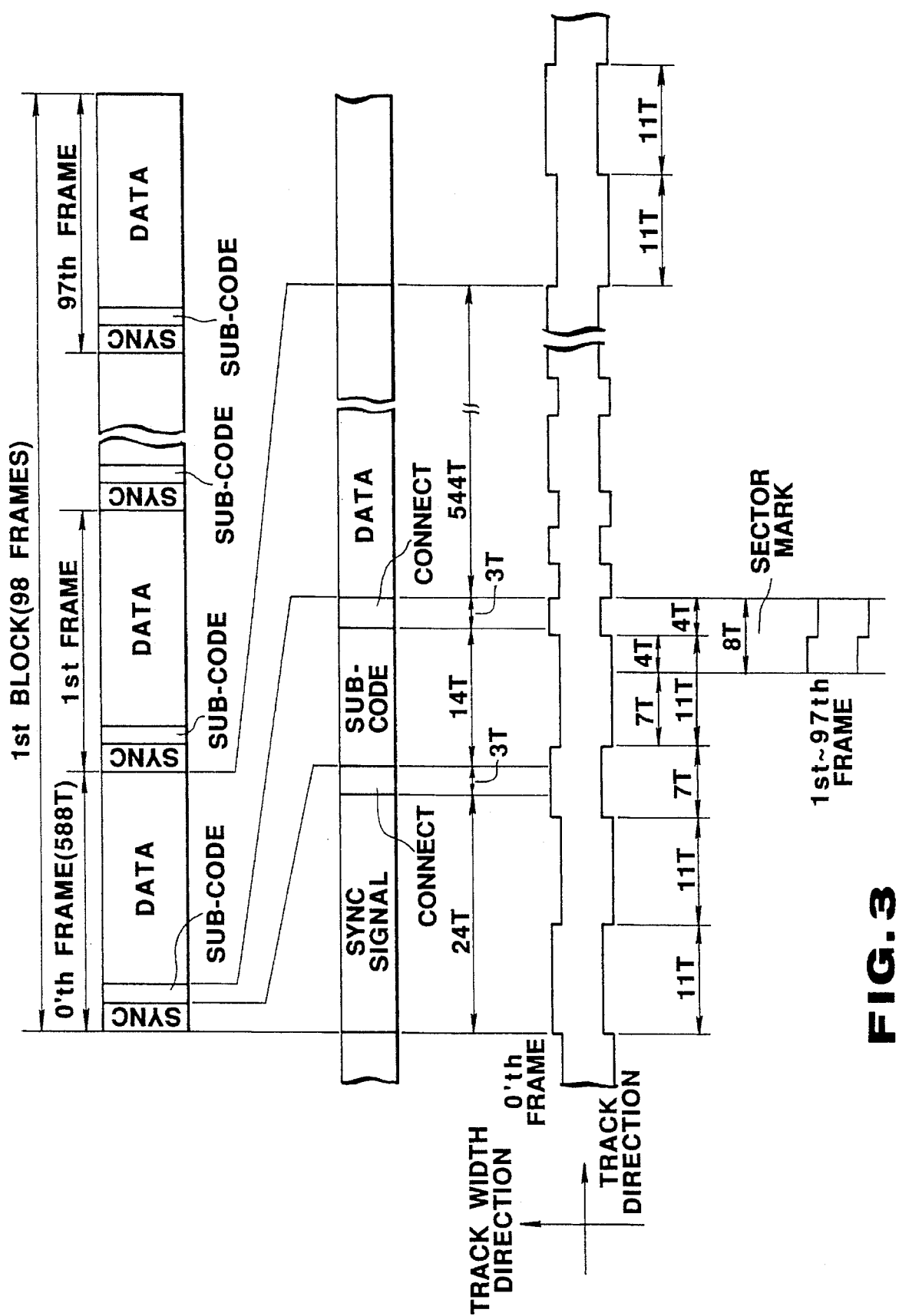
FIG. 3 shows a typical example of a recording format of a read-only area of the disk.
Figure 4:
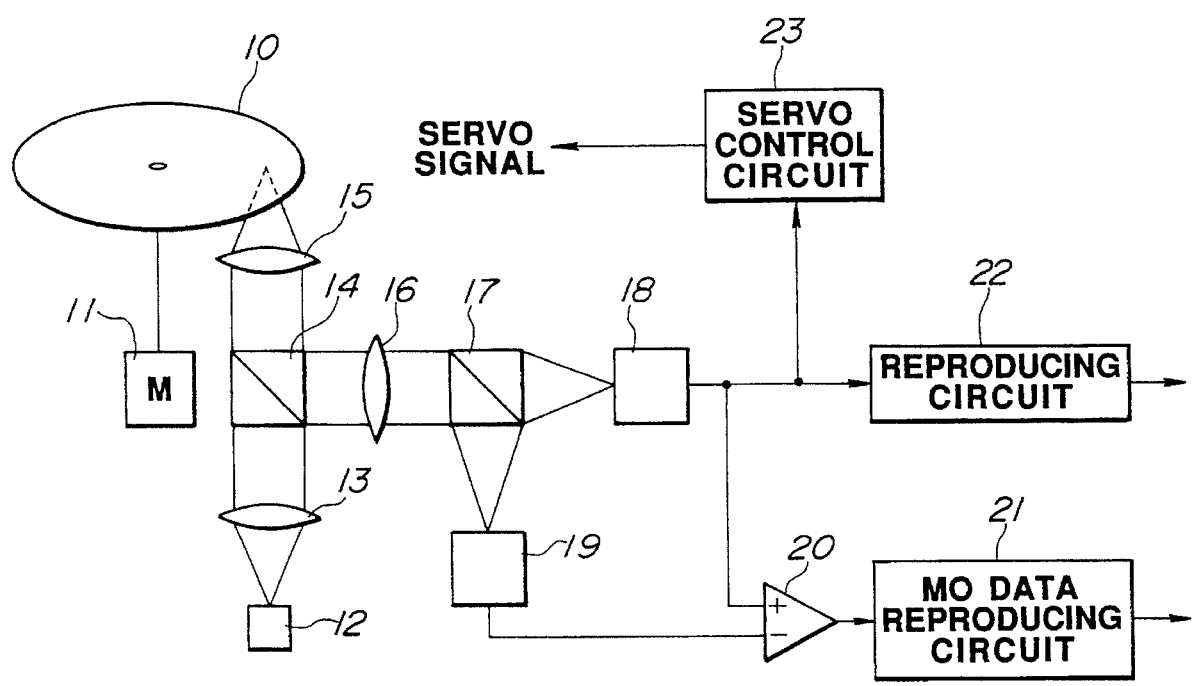
FIG. 4 is a block circuit diagram showing a typical example of a recording/reproducing apparatus for illustrating the present invention.

FIGS. 2 through 4 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The preferred embodiment of the present invention is hereinafter explained by referring to the accompanying drawings. Referring to FIG. 2, a magneto-optical disk 10 has a transparent base plate on which a perpendicular magnetization film exhibiting magneto-optical effects is formed. The magneto-optical disk 10 is divided into, for example, a recordable area 2 (RAM area) on its outer periphery and a read-only area 6 (ROM area) on its inner periphery. On this magneto-optical disk 10, tracking guide grooves are provided in the form of a helix or of concentrical circles. In the RAM area 2, the inside of the groove or the land between the adjacent grooves is used as the recording track on which data is to be recorded photo-magnetically. FIG. 2 shows parts of two adjacent recording tracks, marked 4A and 4B. These can be adjacent parts of the same recording track if the recording track is in the form of a spiral. In the ROM area 6, tracks are formed, in which the data which is only to be read is expressed in the form of lateral deviations or offsets of the tracks in the direction of the track width, i.e. by modulation along the track. FIG. 2 shows parts of two adjacent recording tracks, marked 7A and 7B. These can be adjacent parts of the same recording track if the recording track is in the form of a spiral. The data in the form of offsets along the track is recorded such that, when the data is read, it is at a frequency sufficiently high as compared with the tracking error signal frequency so as not to affect tracking error signals produced from the tracks 7A and 7B.

When the data which is only to be read is recorded in the ROM area 6 in the form of offsets along the track, tracking error detection in the ROM area with the aid of the guide grooves may be performed in the same way as in the RAM area 2. In this manner, even when track jumps should occur across the RAM area 2 and the ROM area 6, tracking may be performed continuously, so that stability of servo capturing is achieved with high response characteristics.

A specific example of a recording format in the ROM area 6 for data which is only to be read is hereinafter explained by referring to FIG. 3.

In the specific example of FIG. 3, a format similar to the format for a compact disk (CD) is used as the data recording format by offsetting along the track in the direction of the track width. In a customary CD format, each block or sector is a data recording unit formed by 98 frames from a 0'th to a 97th frame, with each frame being 588 times the channel clock period T or 588T. Recording areas for frame sync signals, sub codes and data including parity bits, are provided within each frame. At the leading end of each fame, 24T frame sync signals, formed by 24 channel bits, and 14T sub codes are connected to each other by 3T connecting bits. In the remaining 544T, 32 symbols or 32 bytes of sample data and parity data are provided after modulation by a so-called EFM or 8–14 modulation system. The frame sync signal is of a so-called out-of-rule pattern not found in the EFM system, and contains a succession of two 11T intervals between transitions. The 14T sub code area corresponds to one symbol.

As data is recorded by offsetting along the track in the specific example of FIG. 3, sync signals are provided having the same format as that of the frame sync signal portion of the CD format. The sync signals consist of a succession of two 11T intervals between transitions, followed by successions of 7T, 11T (=7T+4T) and 4T intervals between transitions, thereby constituting 44T of the leading portion of each frame inclusive of the above mentioned 22T frame sync pattern. These sync signals are used for synchronization of each frame as a unit. However, for synchronization of each sector constituted by a plurality of blocks, here 98, as a unit, the 8T at the terminal end of the leading 44T may be used as the sector or block mark for block synchronization. For example, the sector mark at the leading frame of a block of the so-called phase encoding system may be written in the sector mark at the leading frame as a "0," with a rise in signal level at the center of 8T, whereas a "1" may be written in the sector marks for the remaining frames, with a drop in signal level at the center of 8T, for distinguishing the frame at the leading end of the block from the remaining frames.

In the remaining 544T (544 channel bit) data area, excluding the 44T sync area at the leading end of the frame, the read-only data is recorded by offsetting along the track with a period which is an integral multiple of the channel clock period T of the CD format, such as 8T, as the reference. In the example of FIG. 3, the PE system with a 1 bit slot equal to 8T is used as the modulation system for the offsetting or deviation along the track. However, when the clock period is an integral multiple of the channel clock period, a so-called biphase mark modulation system or the EFM or 8–14 modulation system may also be employed. When the recording along the track is performed by the above mentioned PE system with 1 bit of 8T, read-only data of 68 (i.e., 544/8) bits may be recorded in the above mentioned 544T data area.

A concrete example of a recording/reproducing data signal on or from a magneto-optical disk, the recording medium in the ROM area of which the read-only data is recorded by an offsetting deviation along the track, is hereinafter explained by referring to FIG. 4.

In this figure, the magneto-optical disk 10 has a RAM area and a ROM area, and is provided with a recording track or tracks in the spiral or concentric form. In the ROM area, data which is only to be read is recorded in the form of offsets along the track. The magneto-optical disk 10 is adapted to be driven rotationally at a constant linear velocity (CLV) or at a constant angular velocity (CAV) by a spindle motor 11. A laser beam from a laser light source 12, such as a laser diode, is collimated by a collimator lens 13 so as to be then irradiated on the magneto-optical disk 10 by means of a beam splitter 14 and a so-called biaxial object lens 15 for focusing and tracking. The reflected beam from the magneto-optical disk 10 is separated by the beam splitter 14 so as to be incident on a polarization beam splitter 17 by means of an optical system 16 such as a ½ wavelength plate, converging lens or a cylindrical lens. The reflected beam is separated in the polarization beam splitter 17 into a P-component and an S-component before being incident into photodetectors 18 and 19 adapted for detecting tracking error signals, focusing error signals and magneto-optical signals (MO signals).

The outputs of the photo-detectors 18 and 19 are transmitted to a differential amplifier 20 to produce a difference for extracting photomagnetically recorded data signals or MO signals, with the output signal from the differential amplifier 20 being transmitted to an MO data reproducing circuit 21. The tracking error signals and the focusing error signals are detected with the aid of a four-segment type device in the light receiving section of the photodetector 18. During accessing of the ROM area, the read-only data, recorded as offsets along the track, may be produced from the high-frequency component of the tracking error signals and transmitted to a read-only data reproducing circuit 22 for data reproduction. The tracking error and focusing error signals are transmitted via servo control circuit 23 to a biaxial type object lens driving unit, not shown.

In this manner, the data which is only to be read is previously recorded or pre-formatted in the ROM area of the disk by offsetting along the track, so that tracking control may be performed in a unified manner, and tracking control switching may be eliminated. On the other hand, it also becomes possible to prevent any adverse effects on tracking by recording the read-only data in the form of pits, while the response characteristics or stability of the tracking control operation at the time of track jumps across the RAM area and the ROM area may be improved.

The recording media, such as optical disks, on which data which is only to be read is pre-formatted by the offsetting or deviation of the recording track itself, may be mass-produced easily by a press working process using a master disk or stamper at the time of disk production.

From the above description, it will be apparent that the invention disclosed herein provides a novel and advantageous optical recording medium. The foregoing discussion discloses and describes merely exemplary methods and embodiments of the present invention. As will be understood by those familiar with the art, the invention may be embodied in other specific forms without departing from the spirit or essential characteristics thereof.

For example, the present invention is not limited to the above mentioned embodiment and may be applied to various recording media, such as an organic dye optical disk, various write-once disks, overwrite disks, optical cards or magneto-optical cards, besides the magneto-optical disks. The RAM area may also be a programmable read-only area, also commonly known as a PROM area. Sync signals or address data may also be recorded in the recording tracks in the RAM area by track deviations or offsets along the track, while photomagnetic recording may also be made on the tracks in the ROM area. It is to be noted in addition that the recording format for data recorded by offsetting along the track is not limited to the specific example shown in FIG. 3. Accordingly, the disclosure of the present invention is intended to be illustrative, but not limiting, of the scope of the invention, which is set forth in the following claims.

What is claimed is:

1. An optical medium for storing a read-write information signal and a read-only information signal that can be read by the same optical means, the medium comprising:

a first area including a means for rewritably storing the read-write information signal, the means including an unmodulated, pre-formed track; and a second area, radially separated from the first area, the second area including a read-only track along which the read-only information signal is stored, the read-only information signal being stored in a plurality of frames, each frame including a frame sync signal, the read-only track having a track direction and a length in the track direction, the read-only track:

being in a nominal position in a direction lateral to the track direction over first portions of its length, and being in an offset position, offset from the nominal position in a direction lateral to the track direction, over second portions of its length, to represent the read-only information signal, and being in the offset position over a second portion of its length equal in length to a predetermined length to provide the frame sync signal, the read-only information signal, when read from the read-only track, generating a read-only signal having a frequency, the read-only information signal being stored on the read-only track such that the frequency of the read-only signal is sufficiently higher than the frequency of tracking error signals produced when the read-only information signal is read from the read-only track.

2. An optical medium according to claim 1, wherein the read-only track is in the offset position over a second portion of its length equal in length to a second predetermined length at the end of the frame sync signal at an interval of a predetermined number of frames to provide a block mark.

3. An optical medium according to claim 1, wherein:

the pre-formed track has a pre-formed track direction and a length in the pre-formed track direction, and the pre-formed track is in a nominal position in a direction lateral to the pre-formed track direction over first portions of its length, and is in an offset position, offset from the first position in a direction lateral to the preformed track direction, over second portions of its length, to represent data control data.

4. An optical medium according to claim 1, wherein the optical medium is a magneto-optical disk.

5. An optical medium for storing a read-write information signal and a read-only information signal, the read-write information signal and the read-only information signal each comprising a plurality of bits, each bit being in one of a first state and a second state, the read-write information signal and the read-only information signal being read from the medium by the same optical means, the medium comprising:

a first area including a means for rewritably storing the read-write information signal, the means including an unmodulated, pre-formed track; and a second area, radially separated from the first area, the second area including a read-only track along which the read-only information signal is stored, the read-only track having a track direction, the read-only track being in a nominal position over a first portion of its length to represent each bit of the read-only information signal in the first state, and the read-only track being in an offset position, offset from the nominal position in a direction lateral to the track direction, over a second portion of its length, to represent each bit of the read-only information signal in the second state.

6. The optical medium of claim 5, wherein the read-only track is in the nominal position over a first portion of its length equal in length to a first predetermined length to represent each bit of the read-only information signal in the first state, and the read-only track is in the offset position over a second portion of its length substantially equal in length to the first predetermined length, to represent each bit of the read-only information signal in the second state.

7. The optical medium of claim 5, wherein the read-only track is substantially circular, the read-only track is in the nominal position over a portion of its length corresponding to a first predetermined angular rotation of the read-only track to represent each bit of the read-only information signal in its first state, and the read-only track is in the offset position over a portion of its length corresponding to an angular rotation of the read-only track substantially equal to the first predetermined angular rotation to represent each bit of the read-only information signal in the second state.

8. An optical medium according to claim 5, wherein reading the read-only information signal generates a read-only signal having a frequency, and the read-only information signal is stored along the read-only track such that the frequency of the read-only signal is sufficiently higher than the frequency of tracking error signals produced when the read-only information signal is read.

9. An optical medium according to claim 8, wherein the read-only information signal is stored in a plurality of frames, each frame includes a frame sync signal, and the read-only track includes a portion in which the read-only track is in the nominal position over a portion of its length equal in length to a second predetermined length followed by a portion in which the read-only track is in the offset position over a portion of its length substantially equal in length to the second predetermined length to provide the frame sync signal.

10. An optical medium according to claim 9, wherein the read-only track includes a portion in which the read-only track is in the offset position over a portion of its length equal in length to a third predetermined length at the end of the frame sync signal at an interval of a predetermined number of frames to provide a block mark signal.

11. An optical medium according to claim 8, wherein the read-only track is substantially circular, the read-only information signal is stored in a plurality of frames, each frame includes a frame sync signal, and the read-only track is in the nominal position over a portion of its length corresponding to a second predetermined angular rotation of the read-only track, and is in the offset position, radially offset from the nominal position, over an angular rotation of the read-only track substantially equal to the second predetermined angular rotation to provide the frame sync signal.

12. An optical medium according to claim 11, wherein the read-only track is in the offset position over a portion of its length corresponding to a third predetermined angular rotation of the read-only track at the end of the frame sync signal at an interval of a predetermined number of frames to provide a block mark signal.

13. An optical medium according to claim 5, wherein the optical medium is additionally for storing data control data, the data control data comprising a plurality of data control bits, each data control bit being in one of a first state and a second state, the pre-formed track has a pre-formed track direction, and the pre-formed track is in a nominal position in a direction lateral to the pre-formed track direction over a first portion of its length to represent each data control bit in the first state, and the pre-formed track is in an offset position, offset from the nominal position in the direction lateral to the pre-formed track direction over a second portion of its length, to represent each data control bit in the second state.

14. An optical medium according to claim 5, wherein the optical medium is a magneto-optical disk.

* * * * *